United States Patent Office 3,410,823
Patented Nov. 12, 1968

3,410,823
METHOD OF REMOVING CONTAMINANTS FROM POLYCARBONATES
Thomas H. Cleveland, New Martinsville, W. Va., assignor to Mobay Chemical Company, Pittsburgh, Pa., a corporation of Delaware
No Drawing. Filed Oct. 15, 1964, Ser. No. 404,161
1 Claim. (Cl. 260—47)

ABSTRACT OF THE DISCLOSURE

A method for removing contaminants from high molecular weight polycarbonates by mixing the contaminated polycarbonates with a liquid inert non-solvent for the polycarbonate which is a good solvent for the contaminants and removing the contaminants with the solvent.

---

This invention relates to polycarbonates and more particularly to a method for the purification of polycarbonates.

In the preparation of polycarbonates, one obtains a solution of the desired polymer together with various low molecular weight fractions, monomers of starting material, and extraneous compounds which were in the starting materials. It is necessary to recover the desired polymer from this contaminated mixture. If the monomers and low molecular weight fractions in particular are allowed to remain in the final product, then subsequent processing of the polycarbonate plastic under heat and pressure will lead to the discoloration of the desired polymer and interfere with its properties. Since some of the impurities are potential color formers, the polycarbonate plastic may discolor under the subsequent heat and pressure necessary to fabricate it into a useful article. A more serious problem, however, is that the impact strength of the polycarbonate is harmed by the presence of the impurities. In addition, polycarbonate parts fabricated from raw materials which contain impurities have a tendency to craze upon being subjected to high moisture, high heat atmospheres.

It is therefore an object of this invention to provide an improved method for the recovery of an improved polycarbonate polymer from a solution thereof containing various impurities. A further object of this invention is to provide a method of removing impurities from polycarbonate materials. Another object of this invention is to provide a method for the purification of a polyaryl carbonate powder based on 2,2-bis-(4,4'-dihydroxy diphenyl)-propane. Still another object of this invention is to provide an improved method of removing low molecular weight fractions, potential color formers, monomers and/or extraneous compounds which were in the starting materials from a polyaryl carbonate.

The foregoing objects and others which will become apparent from the following description are accomplished in accordance with this invention, generally speaking, by providing a method of recovering substantially pure solid polycarbonates from a mixture thereof with contaminants by mixing the contaminated solid polycarbonate with a liquid inert non-solvent, for said polycarbonate which is a good solvent for the contaminants. This invention is particularly applicable to the removal of monomeric dihydric phenols and low molecular weight fractions which contaminate a solid polyaryl carbonate by mixing the contaminated solid polycarbonate with a liquid inert non-solvent for the polycarbonate, which is a good solvent for the monomeric dihydric phenol and low molecular weight polycarbonate. Certain solvents have been discovered which will extract or leach out monomers of the dihydric phenol and low molecular weight fractions of the polycarbonate from the mixture resulting from the preparation of high molecular weight polycarbonate. These solvents are in particular acetone which is strongly preferred as well as other low boiling ketones such as methyl ethyl ketone and others having a boiling point up to about 140° C. at atmospheric pressure and most preferably below about 100° C. In addition, one may use low boiling ethers, particularly low boiling dialkyl ethers which have a boiling point up to about 140° C. at atmospheric pressure and most preferably below about 100° C. at atmospheric pressure. Suitable low boiling ethers include diethyl ether, diisopropyl ether, dipropyl ether, dibutyl ether, ethyl propyl ether, ethyl butyl ether, and the like. In addition, one may use carbon tetrachloride. Any solvent which is simultaneously a nonsolvent for the high molecular weight polycarbonate and a good solvent for the monomeric dihydroxy phenol as well as the low molecular weight fractions of the polycarbonate may be used. It is to be understood that a nonsolvent for the high molecular weight polycarbonate is one which will not cause the high molecular weight polycarbonate to swell or agglomerate.

The polycarbonates contemplated by the process of the present invention include all of those polycarbonates containing impurities which inhibit the recovery of a high molecular weight, high grade product. The high molecular weight polycarbonate preferably has a molecular weight above about 20,000 (best 30,000 to 100,000). The low molecular weight fraction to be removed preferably has a molecular weight below 5000. The invention is particularly valuable for removing fractions with a molecular weight of 2000 or less. The polycarbonate resins may be prepared by transesterification of a diaryl carbonate with a dihydroxy phenol, by direct reaction of phosgene with a slurry of aqueous alkali, organic solvent, dihydroxy phenol and a catalytic quantity of a quaternary base or by direct reaction of phosgene with a solution of a dihydroxy phenol which contains a tertiary amine. A number of patents disclose polycarbonate materials which could be purified in accordance with the method of the present invention. Typical polycarbonate materials are described in Canadian Patents 578,585, 578,795, and 594,805 and in U.S. Patents 2,999,846, 2,970,131, 2,991,273, 2,999,835, 3,014,891, and 3,017,424.

The method of the invention is carried out in a simple and straightforward manner by simply mixing the contaminated polycarbonate solids, e.g. pellets or powder, with the liquid which is both a solvent for the monomers and low molecular weight fractions and a non-solvent for the high molecular weight polycarbonate. It is desirable to mix the contaminated powder of polycarbonate with the liquid inert non-solvent therefor and heat the resulting slurry at reflux for about 1 to 6 hours in order to provide for contact with all of the contaminants and do a through job of leaching the polycarbonate powder. After the reflux period, the desired high molecular weight polycarbonate is removed from the solvent preferably by filtration and after washing, if desired, with additional liquid is dried and ready for use. It may be desirable in some cases to treat the polycarbonate powder more than once with the liquid such as acetone in order to achieve a high degree of purification.

The purified material may be used where polycarbonates have been used heretofore but with improved results, for example, the tendency to craze, discoloration on subjection to heat and high humidity, and the impact resistance of products fabricated from the purified polycarbonate is improved. Products which may be fabricated include motor part housings, crash helmets, football helmets, airplane parts and the like.

The invention is further illustrated by the following examples in which parts are by weight unless otherwise specified.

Example 1

About 685 parts of 2,2-(4,4'-dihydroxy diphenyl) propane Bisphenol A (3 mols), about 6.5 parts of p-t-butyl phenol, are suspended in about 2640 parts of water, in a well agitated three neck reaction flask. The three neck flask is equipped with a gas addition tube and a drip tube for the addition of liquid. The oxygen is removed from the suspended Bisphenol A slurry by blowing nitrogen through it for a 15 minute period. After the removal of oxygen, about 480 parts of 50% solution of sodium hydroxide are added. The reaction flask is then cooled to about 25° C. by the application of external cooling. After the 25° C. temperature has been reached, about 1500 parts of methylene chloride are added to the reactor while agitating. After the methylene chloride addition is completed, the addition of phosgene is started at such a rate that over a 100 minute period, about 356 parts (3.6 mols) phosgene are added while agitation is maintained. Simultaneously with the start of phosgenation, the addition of 50% sodium hydroxide is also commenced so that in an 80 minute period, about 192 parts of sodium hydroxide solution are added to the mixture. The temperature during the phosgenation reaction is maintained at 25° C. by the application of external cooling. At the end of the phosgenation, 2 parts of triethylamine are added to the reaction mixture and the mixture is agitated for a period of about 20 minutes. The agitation is now stopped and the mixture is allowed to separate into two phases. The lower, heavy phase will contain the polycarbonate in the form of a solution and the top phase will contain water, unreacted sodium hydroxide and sodium chloride. The top phase is decanted and disposed of. The polymer solution is successively washed with 1% sodium hydroxide and with 1% phosphoric acid which is followed with water washes until the overflow water is essentially free of electrolyte. In this process, after the end of the phosgenation, the reaction mixture is discharged to a heavy duty mixer such as a Baker-Perkins sigma mixer and the 2 parts of triethylamine are added to the reaution mixture in the sigma mixer. After about 30 minutes of agitation in the sigma mixer, the mixture becomes extremely viscous and forms a dough and an aqueous alkaline layer. The aqueous alkaline layer is discharged to the seer, the dough is repeatedly washed with dilute caustic and dilute phosphoric acid and finally with several changes of distilled water until the overflow water shows essentially no electrolyte as determined by conductivity measurements. At the end of washing, this dough will break up into small particles which are dried to a powder.

Example 2

About 20 parts of polycarbonate powder obtained by the process of Example 1 are put into a Soxhlet extractor wherein the powder is contacted for a period of about 4 hours with heated acetone. The acetone is heated to a temperature of about 50 to 56° C. and is maintained in contact with said polycarbonate powder in the extractor for the above time period. Analysis of the powder before and after extraction with the acetone provides the following values.

| Phenolic monomer | Monomer content of polymer before extraction | Monomer content of polymer after extraction |
|---|---|---|
| Bisphenol A, percent | 0.23 | } Total phenolics less than 0.01. |
| p-Tert. butyl phenol, percent | 0.04 | |

Example 3

The same procedure used in Example 2 was followed except that the extraction period was continued for about 3 hours. The results were as follows:

| Phenolic monomer | Monomer content of polymer before extraction | Monomer content of polymer after extraction |
|---|---|---|
| Bisphenol A, percent | 0.23 | 0.01 |
| p-Tert. butyl phenol, percent | | 0.01 |

Example 4

After about 500 parts of the polycarbonate powder as prepared in Example 1 is extracted by stirring a slurry of the powder in three liters of acetone under reflux at atmospheric pressure for a period of about 3 hours, the resulting powder is collected on a filter and washed several times with fresh acetone. Analysis of the dried extracted powder provides the following results:

| Phenolic monomer | Monomer content of polymer before extraction | Monomer content of polymer after extraction |
|---|---|---|
| Bisphenol A, percent | 0.23 | 0.02 |
| p-Tert. butyl phenol, percent | 0.04 | 0.01 |

Example 5

The procedure of Example 2 was followed except that the amounts of acetone and polycarbonate powder were varied. In the following table two different experiments are indicated wherein a Soxhlet extractor was used in one and a 5-liter flask was used in the other. The results are as follows:

| Equipment used | Amount of polycarbonate extracted, g. | Impurity (monomer) | Monomer level in polymer, percent | |
|---|---|---|---|---|
| | | | Before leaching | After leaching |
| Soxhlet | 20 | Bisphenol A | 3.2 | 0.04 |
| | | p-T. butyl phenol | | 0.01 |
| 5-liter | 500 | Bisphenol A | 3.2 | 0.10 |
| | | p-T. butyl phenol | | 0.01 |

Example 6

In the following example the preferential removal of low molecular weight polymer from polycarbonate powder by the process of this invention is illustrated. About 1500 parts of polycarbonate powder as obtained by the method of Example 1 were extracted in a 12-liter flask for a period of about 3 hours in the presence of 6 liters of heated acetone under reflux conditions. The results of the preferential removal are listed below:

| | Before leaching with acetone | After leaching with acetone |
|---|---|---|
| $M_w$ (by fractionation) | 40,000 | 39,800 |
| $M_n$ (by fractionation) | 24,100 | 29,200 |
| $M_w/M_n$ | 1.66 | 1.36 |

The extracted solids amounted to 1.5% of the original and upon fractionation gave the following data:

$M_w$ ---------------------------------------- 1,500
$M_n$ ---------------------------------------- 740
$M_w/M_n$ ------------------------------------ 2.02

In the foregoing examples, $M_n$ refers to the molecular weight number average and $M_w$ refers to the molecular weight average so that $M_w/M_n$ on the purified material should be nearer to unity after the purification: It is also to be understood that any other suitable solvent for the contaminant, which is also a non-solvent for the high molecular weight polycarbonate may be used.

Although the invention has been described in considerable detail in the foregoing it is to be understood that such detail is solely for the purpose of illustration and

What is claimed is:

1. A method of preparing a substantially pure polycarbonate having a molecular weight of at least about 20,000 which comprises reacting in a first step phosgene and a dihydroxy phenol in an inert organic solvent and recovering a polymer by evaporation of said solvent, mixing the resulting contaminated polymer solids with a liquid consisting of acetone to prepare a slurry and refluxing said slurry for from about 1 to about 6 hours to bring about solution of the monomeric dihydroxy phenol and low molecular weight polycarbonate fractions and subsequently separating the high molecular weight polycarbonate therefrom.

References Cited

UNITED STATES PATENTS

| | | | |
|---|---|---|---|
| 2,213,060 | 10/1965 | Jackson et al. | 260—47 |
| 3,214,500 | 10/1965 | Maerov et al. | 260—47 |
| 3,245,963 | 4/1966 | Schramm et al. | 260—77.5 |
| 3,267,075 | 8/1966 | Schnell et al. | 260—47 |

FOREIGN PATENTS

| | | |
|---|---|---|
| 1,100,949 | 3/1961 | Germany. |

OTHER REFERENCES

Wineman, American Chem. Soc. Div. of Organic Coatings and plastic Chemistry, New York meeting, September 1960, vol. 20, No. 2, pp. 135–145.

GEORGE F. LESMES, *Primary Examiner*.